Figure 19:
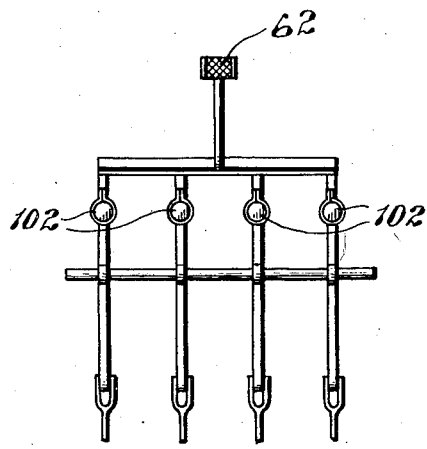

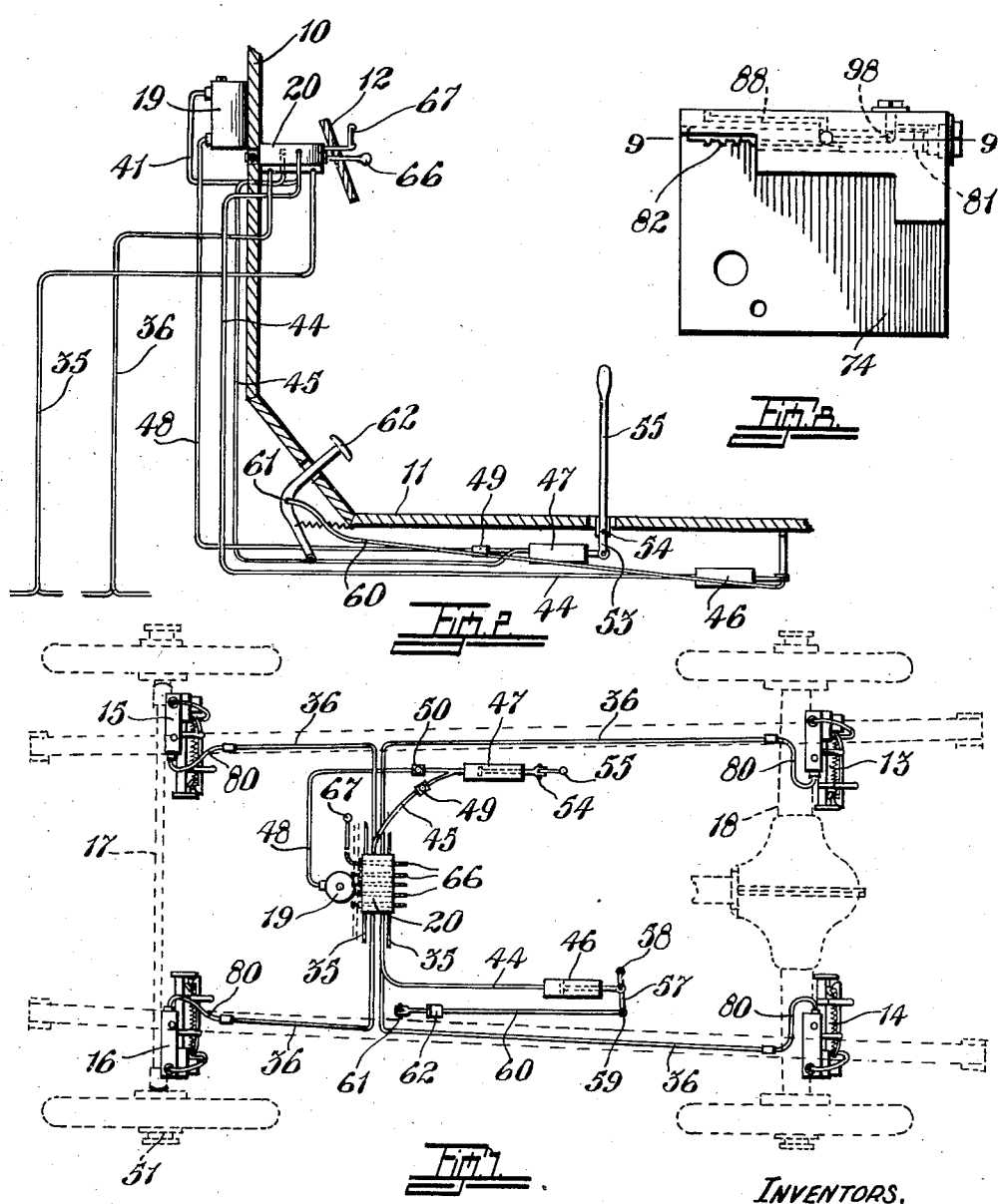

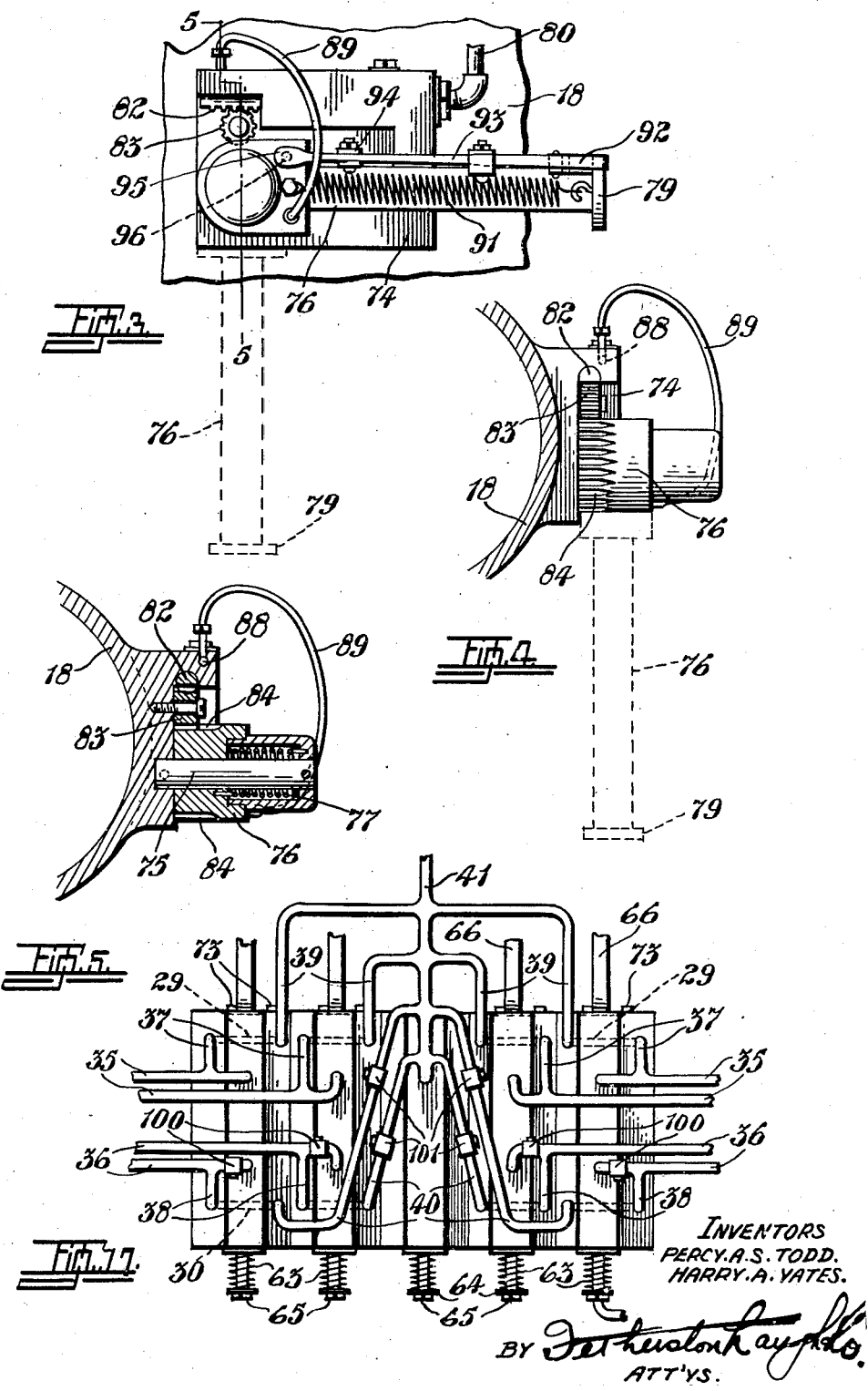

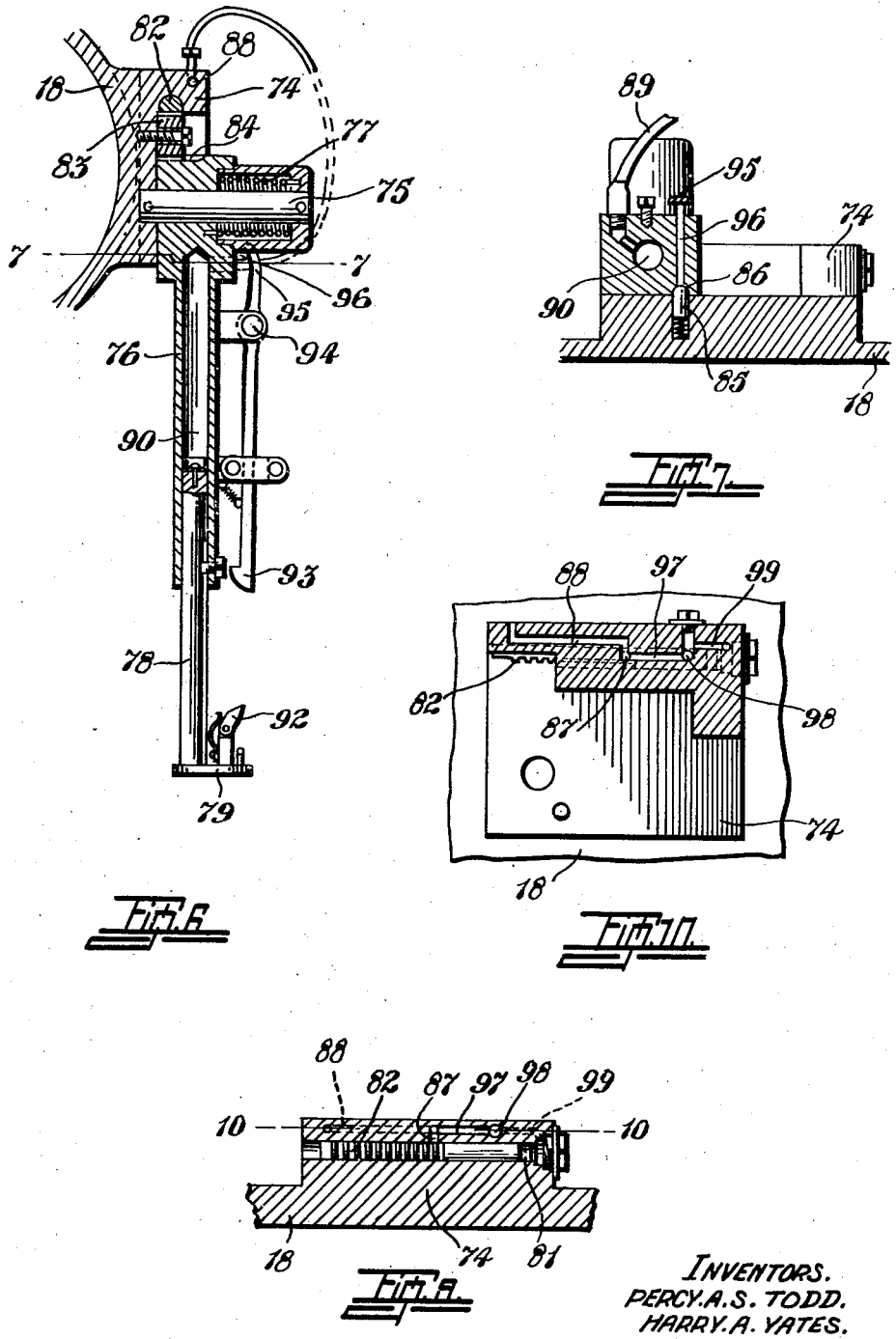

Jan. 8, 1929.
P. A. S. TODD ET AL
1,698,612
AUTOMOBILE JACK AND BRAKE OPERATING DEVICE
Filed Oct. 12, 1925   5 Sheets-Sheet 4
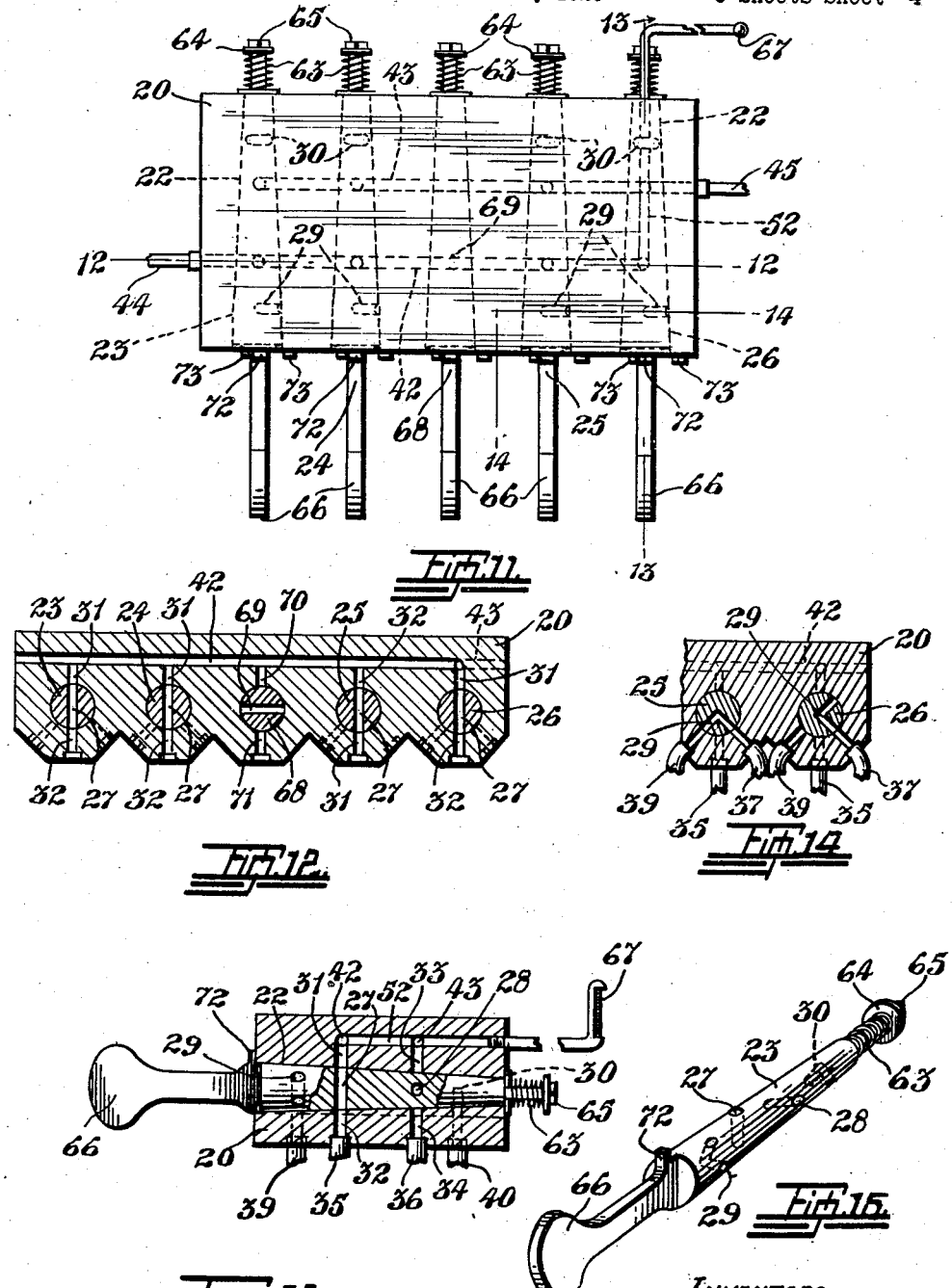
INVENTORS.
PERCY. A. S. TODD.
HARRY. A. YATES.
BY Featherstonhaugh & Co.
ATT'YS.

Jan. 8, 1929.                                                    1,698,612
                     P. A. S. TODD ET AL
           AUTOMOBILE JACK AND BRAKE OPERATING DEVICE
                 Filed Oct. 12, 1925        5 Sheets-Sheet 5

INVENTORS.
PERCY. A.S. TODD.
HARRY. A. YATES.
BY Fetherston Laughlin
ATT'YS.

Patented Jan. 8, 1929.

1,698,612

UNITED STATES PATENT OFFICE.

PERCY ARTHUR STANLEY TODD AND HARRY ALEXANDER YATES, OF OTTAWA, ONTARIO, CANADA.

AUTOMOBILE JACK AND BRAKE OPERATING DEVICE.

Application filed October 12, 1925. Serial No. 62,086.

This invention relates to improvements in automobile jack and brake operating devices as described in our United States application Serial Number 757,941, filed December 24th, 1924, and allowed May 14th, 1925, issued November 3, 1925, Patent No. 1,560,460, for automobile jack and brake operating devices, and the objects of the invention are to provide an effective, durable and simply constructed device for jacking an automobile or the like and operating the brakes, which can be readily fitted to cars of different construction without interfering therewith and whereby the wheels may be jacked individually or collectively without moving from the driver's seat.

Further objects are to provide a device of this character in which the brakes are automatically applied to the wheels not being jacked.

Still further objects are to provide jack-operating means so arranged with brake operating means for automobiles and the like that the jacks may be operated independently of the brakes to jack one or all of the wheels and whereby, in the operation of the jacking means, the brakes are automatically operated to apply their brake to the wheels that are not being jacked.

Still further objects are to provide combined jack and brake operating means for automobiles and the like which can be operated independently or simultaneously from the driver's seat.

Yet another object is to provide jack and brake operating means adapted to all makes of automobiles, low priced as well as high priced, and particularly designed to be economically operated and so constructed that it will not be liable to get out of order and will at the same time effectively perform the various functions required.

Another object is to provide jack and brake operating means for each wheel of an automobile and the like which can be adapted to any type of car and which can be fitted at a price within the reach of all automobile owners.

With the foregoing and other objects in view, the invention consists essentially in the combination with a vehicle such as an automobile fitted with jacks and brakes for one or more of the wheels, of means operable from the driver's seat for separately operating and applying from the same control the jacks and brakes, for applying the brakes to the wheels that are not being jacked and for applying the brakes in the ordinary way without interfering with the jacking means.

Figure 16:
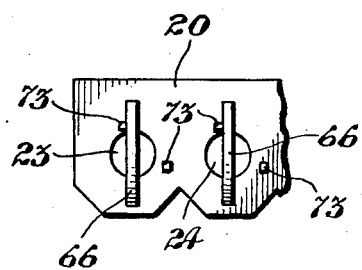
Figure 18:
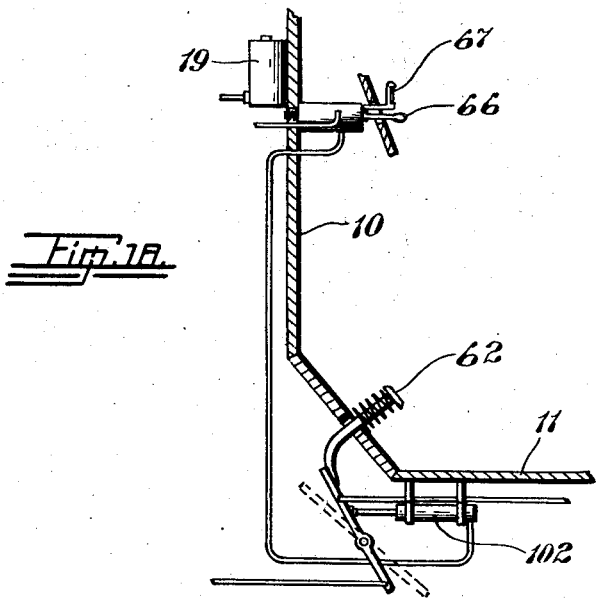

Referring now to the drawings, in which like characters of reference indicate corresponding parts in each figure:

Figure 1 is a plan view of our improved automobile jack and brake operating means as applied to an automobile, the dotted lines indicating the car, Figure 2 is an elevation partially in section through the dashboard and footboard of an automobile fitted with our improved automobile jack and brake operating means, Figure 3 is an enlarged view of a jack in inoperative position on the axle of a car, Figure 4 is an end view of a jack, the dotted lines showing the jack in vertical or operative position, Figure 5 is a section on line 5—5 of Figure 3, Figure 6 is a longitudinal section through the jack in operating position, Figure 7 is a section on line 7—7 of Figure 6, Figure 8 is an enlarged elevation of a jack operating block, Figure 9 is a section on line 9—9 of Figure 8, Figure 10 is a section on line 10—10 of Figure 9, Figure 11 is a plan view of the control box, Figure 12 is a section on line 12—12 of Figure 11, Figure 13 is a section on line 13—13 of Figure 11, Figure 14 is a section on line 14—14 of Figure 11, Figure 15 is a perspective view of one of the valve members, Figure 16 is a fragmentary face view of the control box showing the stops mounted thereon, Figure 17 is a plan view of the underside of the control box showing the pipe connections, Figure 18 is a section through the footboard and dashboard showing a modification of our operating device, Figure 19 is a front view of the modification illustrated in Figure 18.

Referring now more particularly to the drawings, in which an example of our device is shown, 10 designates the dashboard of an automobile, 11 the footboard and 12 the instrument board, while the numerals 13, 14, 15 and 16 designate the jacks, one for each wheel arranged adjacent thereto on the axles 17 and 18 of the car. The essential features of our invention are the means in the form of liquid, air or the like, under pressure, controlled and operated from the driver's seat whereby these jacks are suitably operated at the will of the driver and whereby the brakes are suitably applied, also as desired by the driver. For this purpose we provide an auxiliary tank 19 mounted on the inside of the dashboard 10, and a control box 20 mounted adjacent thereto. This control box forms an important feature of our invention, and comprises, as more particularly illustrated in Figures 11 to 17, a solid body in which are a plurality of bores 22 transversely extending in spaced relationship to one another and slightly tapered towards their inner ends.

Within the bores 22 are rotatably fitted valves 23, 24, 25 and 26. These valves are provided with passageways 27 and 28 extending therethrough at right angles to one another. The passageways 27, when the valves are in normal position as shown in Figure 12 in the control box, are designed to register with a series of spaced openings 31 and 32 in the top and bottom of the box while, when the valves are rotated, the passageways 28 arranged at right angles to the passageways 27 will register with a series of openings 33 and 34 in the top and bottom of the box respectively. The openings 32 are each connected directly by conduits 35 with the brakes, while the openings 34 are connected through conduits 36 with the jacks for each wheel. These conduits 35 and 36 are formed with branches 37 and 38 at their upper ends which communicate with the triangular passageways 29 and 30 in the valves, which in turn communicate with the return conduits 39 and 40 leading to the main return conduit 41 (see Figure 17) which is connected to the reservoir or tank 19.

Communicating with the series of openings 31 and 33 in the top of the member 20 and for supplying the operating medium, in the form of oil in the present example of our invention, are formed longitudinally extending channels 42 and 43 communicating on opposite sides of the box with conduits 44 and 45 connected at their other ends to compression generating pumps 46 and 47, the pump 47 being connected to the tank 19 by a branch conduit 48 (see Figure 1). The conduits 45 and 48 are provided with ball check valves 49 and 50 so that when the pump 47 is operated the liquid or other suitable operating medium in the tank 19 will be drawn therefrom through the conduit 48 and, on the pump 47 being further operated, will be forced under pressure through the conduit 45 into the control box 20 into the channel 43 and thence, as the valves are operated, through the openings 33, 28 and 34, under pressure, through conduit 36 to the jacks, returning through branch 38 of said conduit into the passageway 30 in the valves and on the valve being further operated back through conduits 40 and the main conduit 41 to the tank 19.

From the foregoing it will be readily seen that, taking for instance the left hand front wheel 51 which it is proposed to jack, the driver of the car will first rotate the valve 23 until the passageway 28 therein registers with the openings 33 and 34 in the control box, the passageway 27 for the brakes being closed and the branch 37 of the conduit 35 registering with the return passageway 29 in the valve. The pump 47 is then operated causing the operating medium, in the present instance oil, to be drawn from the tank 19 through the conduit 48 and delivered under pressure, through the conduit 45 and the channel 43 in the control box to the openings 33, passageways 28 and conduit 36, to the jack 16 where, as also hereinafter more fully described, it causes the jack to assume a vertical position, as illustrated in Figure 6, lifting the wheel from the ground.

Referring now to Figure 11, the channel 43 is connected by a cross channel 52 to the channel 42 so that when the operating medium is delivered to the channel 43 it will also be delivered to the channel 42 and will be available to operate the brakes through openings 31 on those wheels which are not being jacked.

The operation of the brakes is similar to that of the jacks, the pump 46 being operated to discharge the liquid under pressure through conduit 44 into the channel 42 in the control member 20, and thence through the openings 31, passageways 27 and 32, conduits 35, direct to the brakes, the return being through the conduit 35, through the channel 42 and thence through conduit 44 back to the pump 46.

Circulation in the conduit and control system is provided for by pressure generating means in the form of pumps 46 and 47, as illustrated in Figure 1, both of which are operable from the driver's seat. The pump 47 is provided with a piston rod suitably connected to a bar or the like 53 pivotally mounted at 54 and provided with a detachable handle 55 protruding upwardly through the floor of the automobile and whereby, on it being moved backwardly and forwardly as previously described, the operating medium for the jacks is drawn through conduit 48 from the tank 19 and forced under pressure back through the conduit 45 into the control box. The piston rod of the pump 46 is connected to a cross-bar 57 pivotally mounted at 58 and connected at its other end 59 to a rod 60 in turn connected at 61 to the foot-operated pedal member 62 protruding through the footboard 11 so that when the pedal 62 is pressed by the operator the piston rod of the pump will be operated to generate pressure.

It will be noted that there is no direct conduit connection between the pump 46 and the tank 19 as in the case of the jack but there is, as previously explained, a connection in the control box between the receiving channels 42 and 43 for the supply of the operating medium to the brakes and the jacks respectively so that when one or two or three of the jacks are being operated, and the fluid or other suitable operating medium is delivered under pressure by the operation of the pump 47 to the control box and the channel 43 therein, it will flow through the connecting channel 52 into the channel 42 and thence back through the conduit 44 to replenish the pump 46, there being accordingly always a sufficient supply of the operating medium in this pump so that when it is operated by the pedal member 62 the fluid or air will be immediately subjected to pressure and delivered to the control box.

On the other hand, when it is desired to only apply the brakes, the foot pedal 62 is operated to operate the pump 46, causing the fluid to be delivered under pressure through the conduit 44 to the control box and into the channel 42 therein and thence through the openings 31 and the passageways 27 in the valves to the brakes. It will thus be seen that the brakes can be operated completely apart from the jacks and also that on the jacks being operated the wheels which are not jacked will automatically have the brakes applied.

Referring again to Figure 11, it will be noted that the valves 23, 24, 25 and 26 are spring-actuated, their protruding ends being provided with coil springs 63 wound thereon and securely held in tensioning position by the washers 64 and lock nuts 65, while the other ends are formed with suitable handle means which extend through the instrument board to be readily operable from the driver's seat. The control box is also provided with a pressure gauge 67 adapted to indicate at all times pressure in the system.

Arranged in the control box 20 is a pressure release valve 68 similar in construction to the valves 23, 24, 25 and 26, except that there is only one passageway 69 therethrough adapted to register with the single passageways 70 and 71 (see Figures 11 and 12) in the top and bottom of the box respectively. This release valve is connected through the passage 71 to the main return line or conduit 41 (see Figure 17) which in turn is connected to each of the valves 23, 24, 25 and 26 by branches 40 for the jacks and branches 39 for the brakes. This release valve is spring-actuated also, similar to the other control valves and when rotated so that the passageway 69 will register with the passageways 70 and 71 the operating medium in the form of oil will flow back directly to the supply tank. All the valves are provided with stops 72 which, when in engagement with the stops 73 mounted on the block 20, in combination with the spring-actuating means, ensure the proper register of the several openings therein.

Referring now to the jacks, these, as illustrated in Figures 3 to 10 inclusive, comprise a block member 74 formed integral with the car axle and having pivotally mounted on the shaft 75 a head member 76, spring-actuated by means of a coil spring 77 to cause the jack to normally assume a horizontal position, and in which is a slidably mounted plunger member 78 provided with a foot 79. In normal position, as illustrated in Figure 3, the member 76 is in a horizontal position and when operated automatically assumes a vertical position to raise the wheel, as indicated in Figures 3, 4 and 6. For operating the member 76 the pressure-operating medium such as compressed air or oil is supplied through the conduit 36 from the control box to the flexible conduits 80, which in turn communicate with a channel or passageway 81 of the block 74 in which is housed a slidably operable plunger rack member 82. The oil under pressure forces this rack outwardly to rotate a pinion 83 adapted to mesh therewith. This pinion in turn engages with teeth 84 on the member 76, causing it, as the pinion rotates, to gradually swing downwardly until the spring-actuated dowel pin 85 coming into engagement with the opening 86 locks it in a vertical position. As the member 76 moves to a vertical position the end of the plunger rack 82 reaches the passageway 87, opening it, this passageway communicates with both the channel 81 and the passageway 88, the flexible conduit 89 establishing communication between the passage 88 and the plunger carrying cylinder 90. The operating medium flowing into the cylinder 90 will force the plunger 78 downward, thus raising the car wheel. On pressure being released, as previously described by the turning of one of the valve members in the control box 20, the plunger 78 is automatically returned to normal position within the member 76 by means of a coil spring 91 connected at one end to the member 76 and at the other end to the foot 79. As the plunger 78 moves inwardly the spring-actuated dog 92 engages the lever 93 pivotally mounted at 94 causing the end 95 to engage and depress the pin 96, thus releasing the dowel pin 85, permitting the member 76 to return to normal horizontal position, as indicated in Figures 1 and 3, by the coil spring 77. Simultaneously with the return of the jack to normal position the pressure medium will return, through the conduit 89, passageways 88 and 87, to the channel 81. As the member 82 moves inwardly in the channel 81, the port 87 communicating therewith is cut off. The medium will then flow along passageway 97, forcing the ball 98 upward, which will permit the medium to flow to the channel 81 by the passageway 99 and to be returned to the reservoir or tank 19 by conduits 80 and 36.

In the event of one wheel being jacked, the other three wheels will be braked automatically, as already described. Should it be required, however, to jack more than one of the wheels, on the valves for such wheels being operated, the jack already in operation will be held so by means of ball check valves 100 on conduits 36. At the same time the operating medium for the brakes will be automatically released, returning uninterruptedly through the unchecked conduits 35.

The conduits 40 are provided with check valves 101 to prevent the returning operating medium from the jacks in operation influencing the jacks not in operation.

Referring now to the modified form as illustrated in Figures 18 and 19, it will be observed that provision is made to install our jack and brake operating device on mechanically braked cars in connection with which we provide the lever operating valves 102 connected through conduits to the pressure pumps.

From the foregoing it will be seen that the features of our invention are:—

(1) That it constitutes means operable from the driver's seat for jacking one or more of the wheels;

(2) That these means are adapted to cooperate with the brake mechanism for the wheels so that the latter can be operated separately and in the ordinary well known manner as heretofore;

(3) That in the operation of jacking one wheel the brake is automatically applied to the wheels remaining unjacked and through the same means for operating the jack.

(4) That when the jack operating means is used on wheels that are braked, the brakes will be automatically released on the wheels being jacked, permitting them to rotate freely;

(5) That by operating the pressure-generating means and the control box the vehicle can be securely parked on a hill or the like or for loading purposes in practically locked position by our improved means;

(6) That with our improved means on a machine, by means of which it is practically impossible to steal it, reduction of theft insurance is possible;

(7) That the box or cabin control permits a vehicle fitted with our invention to be jacked during the night, thus relieving the vehicle and tires of the weight, thereby adding to the life of both.

As many changes could be made in the above construction and many apparently widely different embodiments of our invention, within the scope of the claims, constructed without departing from the spirit or scope thereof, it is intended that all matter contained in the accompanying specification and drawings shall be interpreted as illustrative and not in a limiting sense.

What we claim as our invention is:

1. In means for jacking and applying brakes to the wheels of motor cars in which fluid operated jacks and brakes are provided for each wheel and are selectively controlled from the driver's seat, a valve box formed with a plurality of bores, fluid supply channels communicating with the bores, delivery conduits for the brakes and jacks for each wheel communicating with the bores, branch return conduits for the brakes and jacks for each wheel communicating with the bores, a main return conduit communicating with the bores, valves adapted to rotatably fit within said bores, spaced passageways through the valves at right angles to one another and adapted to selectively communicate with the channels and the delivery conduits respectively, and triangular passageways in the valves adapted to individually register with the branch conduits and the main return conduit, respectively.

2. A control box formed with a plurality of bores, parallel series of spaced openings in the top and under side of the box communicating with said bores, rotatable valves for the bores, spaced passageways at right angles to one another through said valves, one of said passageways normally registering with one of the series of openings in the top and under side of the box and the other of said passageways being out of alignment with the other series of openings in the top and under side of the box, and whereby on the valves being rotated the first mentioned passageway in the valve is automatically closed and the second mentioned passageway automatically registers with the second series of top and under side openings in the box, spring actuating means for the valves, a release valve formed with a single passageway therethrough communicating with the openings in the top and under side of the box, a main return line communicating with said passageway, and a plurality of branches connecting the main return line with each of the valves.

3. A control box comprising a plurality of bores, parallel series of spaced openings in the top and under side of the box communicating with said bores, a plurality of spring actuated valves rotatable in said bores, spaced passageways at right angles to one another through said valves, one of said passageways normally registering with one of the series of openings in the top and under side of the box, and the other of said passageways being out of alignment with the second series of openings in the top and under side of the box and whereby on the valves being rotated the first mentioned passageway in the valve is automatically closed and the second mentioned passageway automatically registers with the second series of top and under side openings in the box, spring actuating means for the valves, spaced and oppositely directed triangular passageways in said valves, and branch fluid return conduits communicating selectively with said passageways.

In witness whereof we have hereunto set our hands.

PERCY ARTHUR STANLEY TODD.
HARRY ALEXANDER YATES.